United States Patent
Stevenson et al.

(10) Patent No.: US 6,802,768 B2
(45) Date of Patent: Oct. 12, 2004

(54) MOTORIZED HVAC AC VALVE

(75) Inventors: Mark W. Stevenson, Appleton, NY (US); Gerald M. Goupil, Jr., N. Tonawanda, NY (US); Raoul Huberty, Bertranbe (LU)

(73) Assignee: Delphi Technologies, Inc., Troy, MI (US)

( * ) Notice: Subject to any disclaimer, the term of this patent is extended or adjusted under 35 U.S.C. 154(b) by 122 days.

(21) Appl. No.: 10/153,100

(22) Filed: May 22, 2002

(65) Prior Publication Data

US 2003/0220066 A1 Nov. 27, 2003

(51) Int. Cl.[7] ............................................. B24D 13/00
(52) U.S. Cl. ................................... 454/69; 251/129.11
(58) Field of Search .............. 454/69, 156; 251/129.05, 251/129.11

(56) References Cited

U.S. PATENT DOCUMENTS

| | | | | |
|---|---|---|---|---|
| 4,050,364 A | * | 9/1977 | Maus | 454/322 |
| 4,996,849 A | * | 3/1991 | Burst et al. | 62/133 |
| 5,160,115 A | * | 11/1992 | Ito et al. | 251/129.12 |
| 5,195,719 A | | 3/1993 | Ball et al. | 251/56 |
| 5,700,191 A | * | 12/1997 | Nieling et al. | 454/69 |
| 5,797,585 A | * | 8/1998 | Auvity | 251/80 |
| 6,048,263 A | * | 4/2000 | Uchida et al. | 454/121 |
| 6,209,404 B1 | * | 4/2001 | Le | 74/89.18 |
| 6,354,935 B1 | * | 3/2002 | Kurokawa et al. | 454/156 |
| 6,398,638 B1 | * | 6/2002 | Shibata et al. | 454/69 |
| 6,471,580 B2 | * | 10/2002 | Ro | 454/69 |

FOREIGN PATENT DOCUMENTS

| | | |
|---|---|---|
| DE | 4424316 | 1/1996 |
| DE | 19620749 | 11/1997 |
| DE | 19943822 | 3/2001 |
| DE | 10004795 | 5/2001 |
| WO | 91/00449 | 1/1991 |
| WO | 91/00451 | 1/1991 |

* cited by examiner

*Primary Examiner*—Derek Boles
(74) *Attorney, Agent, or Firm*—Patrick M. Griffin

(57) ABSTRACT

A motorized valve assembly for use in a vehicle heating, ventilating, and air conditioning module comprises a valve having at least one flap and is pivotable about a pivot axis. A drive unit is affixed to the valve, and a drive interface is operably connected to the drive unit for inducing a pivoting force about the pivot axis.

17 Claims, 5 Drawing Sheets

MOTORIZED HVAC AC VALVE

TECHNICAL FIELD

The above-referenced invention relates to vehicle heating, ventilation and air conditioning systems, and more specifically to ventilation valves controlling airflow within a vehicle HVAC system.

BACKGROUND OF THE INVENTION

Vehicle ventilation systems have long been utilized in vehicles to provide comfort to the vehicle occupants. Initial ventilation systems comprised a simple duct that was opened or closed by a manually operated valve directing outside ambient air to the vehicle interior. Through the years, consumers have desired increased interior comfort and manufacturers have delivered systems to satisfy consumer demand for improved interior temperature control. Advances made over the years include directing air over a heated core for delivering hot air to the vehicle interior and also for delivering hot air to the windshield to keep the windshield clear of frost and moisture. Subsequently, air conditioners have also become commonplace accessories in vehicles to provide cool air for the comfort of passengers in summer's heat.

Heating ventilation and air conditioning systems in today's vehicles now provide total interior climate control. These new systems automatically maintain a desired temperature by delivering an appropriate mix of heated, ambient, and cooled air to the vehicle interior. More advanced systems also permit occupants to select a desired temperature for their individual zones and automatically maintain these zones at the pre-selected temperature. Such operation necessarily requires the use and operation of multiple valves and ducts to achieve the desired operation of the vehicle heating, ventilation and air conditioning system.

While the sophistication and complexity of heating ventilation and air conditioning (HVAC) systems for vehicles has steadily increased, the design of valves utilized in HVAC systems has remained relatively unchanged throughout the years. Vehicle HVAC modules now include a number of separate valves that have been automated through the use of various types of actuators mounted exteriorly to the HVAC module and either connected to the valve directly or with mechanical linkages such as gears, push rods, or mechanical arms. Typically, these valves are hinged doors and activation of the actuator causes the valve door to rotate about the hinge between an opened and closed position. This type of valve design necessarily requires that the valves connect to their respective actuating mechanisms through the HVAC module case. Consequently, these valves require space for unimpeded rotation of the door about the hinge in addition to the space required on the exterior of the HVAC module for the valve actuator and actuating mechanisms. System space in a vehicle is now at a premium with an ever-increasing demand to reduce the volume and cost required for individual systems. Additionally, the valves and actuators, and the necessary linkage therebetween, must be independently assembled to the HVAC system and thus become labor intensive in an era where labor is increasingly expensive and thus desirable to minimize. Furthermore, ventilation valves having exteriorly mounted actuators and interconnecting mechanical linkages extending through the module case permit leakage of air from the module as well as produce objectionable noises to the vehicle occupants. Such noises tend to detract and annoy the occupants as well as fostering a perception of decreased quality.

Thus, there is a need for a ventilation valve for use in vehicle heating ventilation and air conditioning systems that is cost efficient, quiet, and requires a minimum volume for operation.

SUMMARY OF THE INVENTION

One aspect of the present invention is a motorized valve assembly for use in a vehicle heating, ventilating, and air conditioning module. The motorized valve assembly comprises a valve having at least one flap and is pivotable about a pivot axis. A drive unit is affixed to the valve, and a drive interface is operably connected to the drive unit for inducing a pivoting force about the pivot axis.

Another aspect of the present invention is an improved heating, ventilation, and air conditioning module for a vehicle. The module being of the type having a housing defining at least one air outlet therefrom, and at least one valve assembly pivotally mounted for opening and closing the air outlet. The improvement comprises a motorized valve assembly wherein the housing defines first and second pivot recesses on opposite sides of said at least one air outlet and wherein the motorized valve assembly comprises a valve having at least one flap and is pivotable about a pivot axis. A first pivot is positioned at a first end of the valve and is received in the first pivot recess, and a second pivot is positioned at a second end of the valve and is received in the second pivot recess. The first pivot and the second pivot are aligned along the pivot axis. A drive unit is affixed to the valve, and a drive interface is operably connected to the drive unit for inducing a pivoting force about the pivot axis to pivot the valve assembly between an open and a closed position.

DETAILED DESCRIPTION OF THE PREFERRED EMBODIMENT

Figure 2:
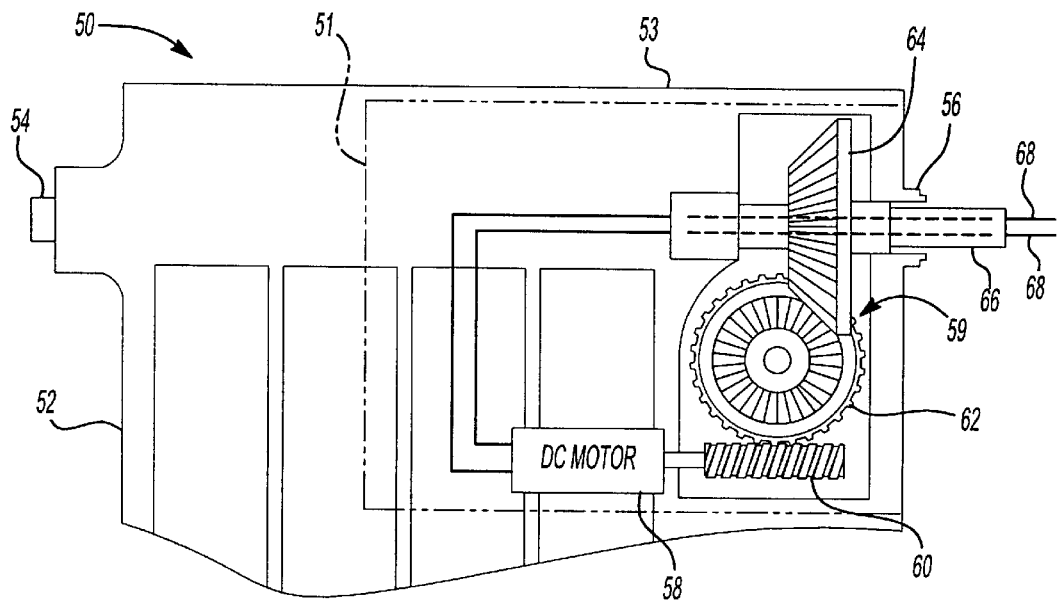
FIG. 2 is a plan view of a valve having an actuating motor mounted thereon.

For purposes of description herein, the terms "upper", "lower", "left", "rear", "right", "front", "vertical", "horizontal", and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
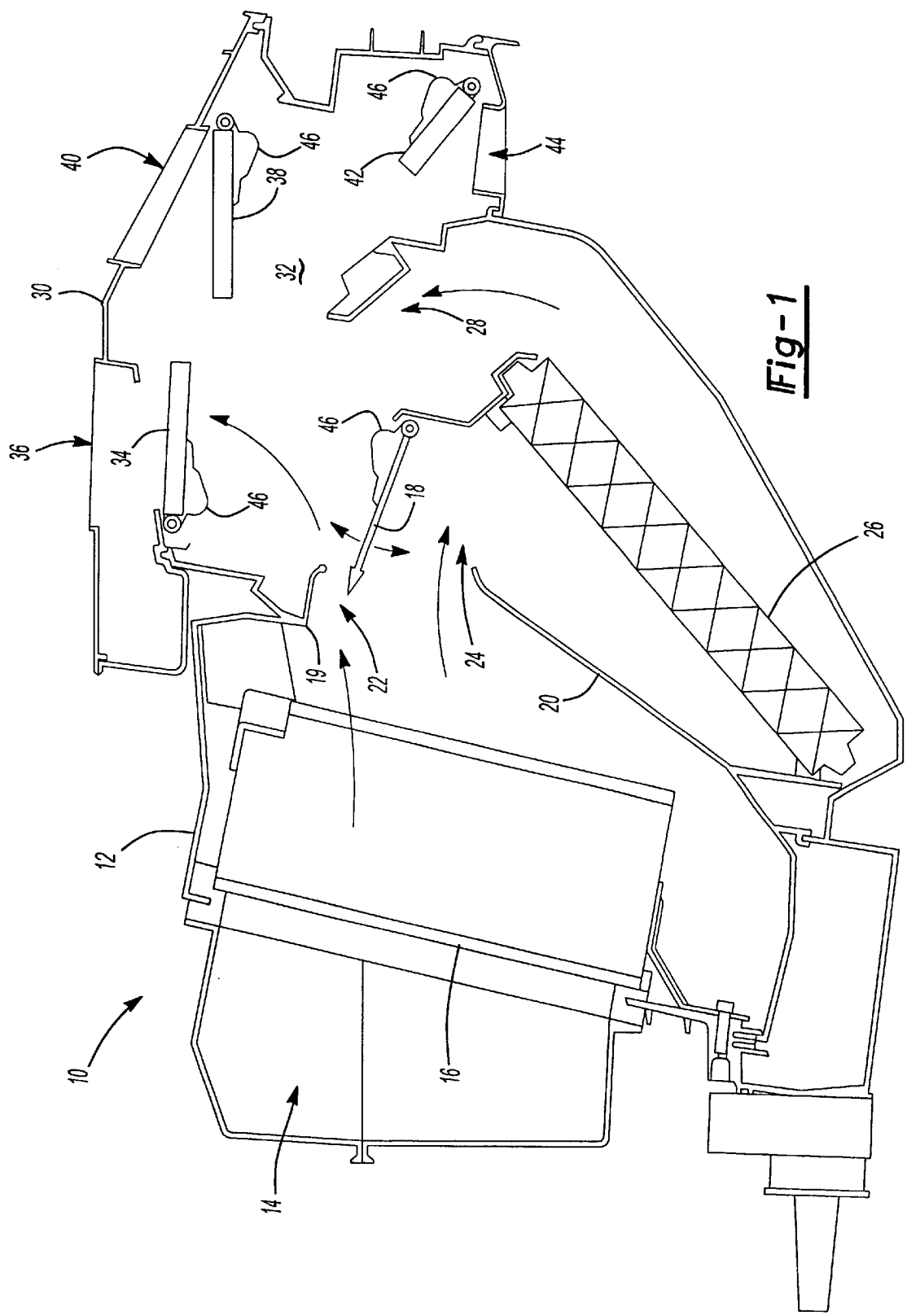
FIG. 1 is a elevation sectional view of a vehicle heating ventilation and air conditioning module embodying the present invention, wherein motors are mounted on the air valves.

Turning to the drawings, FIG. 1 shows a heating ventilation and air conditioning (HVAC) module 10 for a vehicle, which is one of the preferred embodiments of the present invention and illustrates its various components including motorized valves.

The vehicle HVAC module 10 is comprised of core module 12 and air distribution module 30. Ambient outside air or recirculated interior air is directed to air inlet 14 and is subsequently directed through air-conditioning evaporator 16 by the HVAC blower (not shown). After the air exits from evaporator 16 to pass between point 19 and wall 20, part of the air is directed through cool air inlet area 22 and part of the air is directed to warm air passage 24. Inlet 22 and passage 24 are variable in area depending upon the position of air mix door 18. Air mix door 18 is hinged to pivot such that the position of air mix door 18 is directly related to the desired air temperature of air to be output to the interior of the vehicle. Thus, to obtain the maximum amount of cool air, air mix door 18 is rotated counterclockwise to maximize the area of cool air inlet 22. If heated air is desired, air mix door 18 is rotated clockwise to create a warm air passage 24 thereby diverting a portion of the air-flow exiting from evaporator 16 to flow through heater core 26 and duct the heated air through heated air inlet 28. An intermediate position of air mix door 18 facilitates a mixture of cool and hot air simultaneously entering air chamber 32 of air distribution module 30 to provide air at a desired temperature.

Air distribution module 30 typically has three designated outlets for delivering the conditioned air to different portions of the vehicle. These outlets are generally referred to as a defrost outlet 36 for delivering air to the interior surface of the windshield, vent outlet 40 for delivering air to the upper portion of the vehicle interior, and a heater outlet 44 for delivering air to the foot wells of the vehicle interior. Valves 34, 38, and 42 can be selectively positioned in closed, opened, or intermediate positions to place the desired HVAC system in the desired function. Door 18, and valves 34, 38, and 42 each have a motor unit 46 mounted thereon to selectively power the valves between open, closed, and intermediate positions. The HVAC module 10 is typically located in the center of the vehicle as are outlets 36, 40, and 44.

Referring now to FIG. 2, a motorized valve assembly 50 according to one embodiment includes a valve 53 having a flap 52 which is selectively pivoted to open and close an outlet such as outlets 36, 40, and 44 (FIG. 1). Valve 53 includes a first pivot 54 at one end of valve 53 and a second pivot 56 at an opposite end of valve 53. First and second pivots define an axis about which valve 53 pivots. A drive unit 51 is mounted to valve 53. Drive unit can be mounted by bonding with an adhesive, with mechanical fasteners, or in other ways commonly know in the art. Drive unit 51 includes an electric motor 58 which is preferably a DC motor. Motor 58 drives a reduction gear assembly 59 to reduce the rotational speed of motor 58. Reduction gear assembly can take many configurations which are well know in the art. Reduction gear assembly 59, for example includes a worm gear 60 directly driven by motor 58. Worm gear 60 in turn engages an outer periphery of reduction gear 62. Reduction gear further engages beveled gear 64 which is operably engages with drive interface 66. Drive interface 66 is preferably a shaft having a non-circular cross section. Such non-circular cross sections, can includes shapes such as a hexagon, a square, a triangle, a "D" section wherein a portion of the shaft is circular and another portion has a flat surface. Electrical wires or an electrical cable 68 extends from motor 58 through shaft 66 to provide a convenient means of routing cable 68 from an interior of the module housing 12 to an exterior by passing cable 68 through one of the pivots 54, 56.

Figure 3:
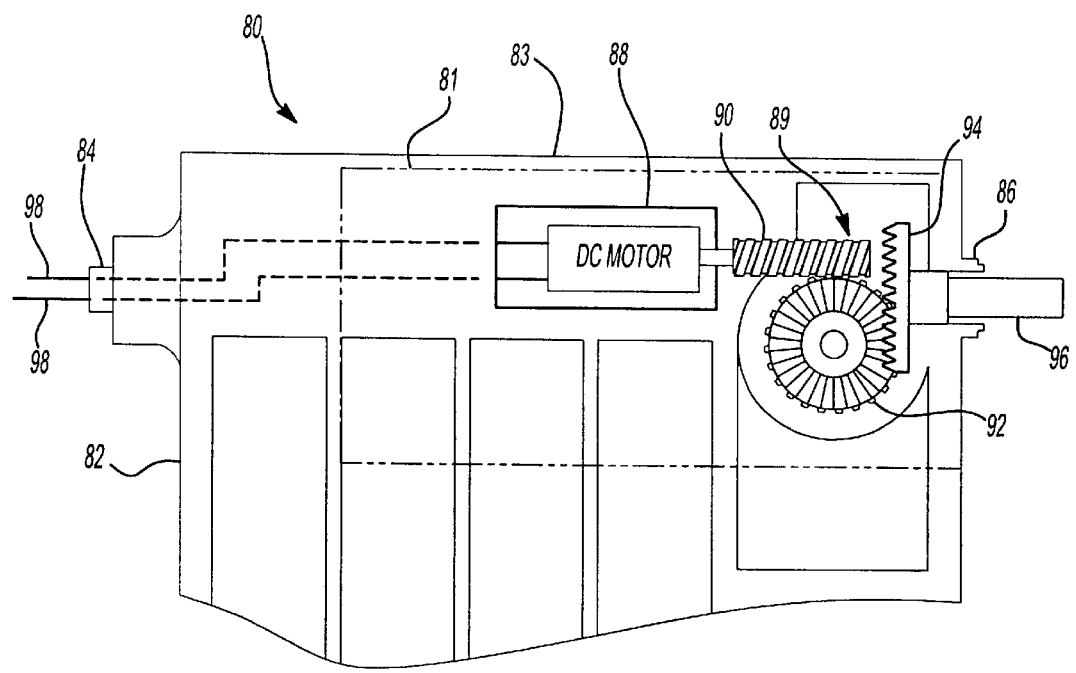
FIG. 3 is an embodiment of an air valve wherein the motor is mounted proximate to a rotational axis of the valve.

FIG. 3 illustrates another valve assembly 80 which is an embodiment similar to the valve assembly 50 illustrated in FIG. 2. Valve assembly 80 includes a valve 83 having a flap 82. Valve 83 includes pivots 84 and 86 at each end of valve 83 and define a pivot axis extending from pivot 84 to pivot 86. A drive unit 81 is affixed to valve 83 in a manner like valve assembly 50 as described above. Drive unit 83 includes an electric motor 88 and a reduction gear assembly 89. Reduction gear assembly includes a worm gear 90 affixed to the output of motor 88 and in turn engages a periphery of reduction gear 92. Reduction gear 92 in turn engages and rotates transverse gear 94. Transverse gear is operably connected to drive interface 96, which as above, is preferably a shaft having a non-circular cross section. Drive unit 81 is configured such that motor 88 and reduction gear assembly 89 are substantially aligned along the pivot axis defined by pivots 84 and 86. This alignment concentrates to a great extent the mass of drive unit 81 close to the pivot axis. By concentrating the mass close to the pivot axis, the valve assembly 80 has a smaller moment of inertia that valve assembly 50 above where motor 58 is significantly displaced from the pivot axis. The smaller moment of inertia thus requires less power from motor 88 to overcome the inertial of the valve assembly when the motor 88 is operating to pivot valve assembly 80.

Figure 4:
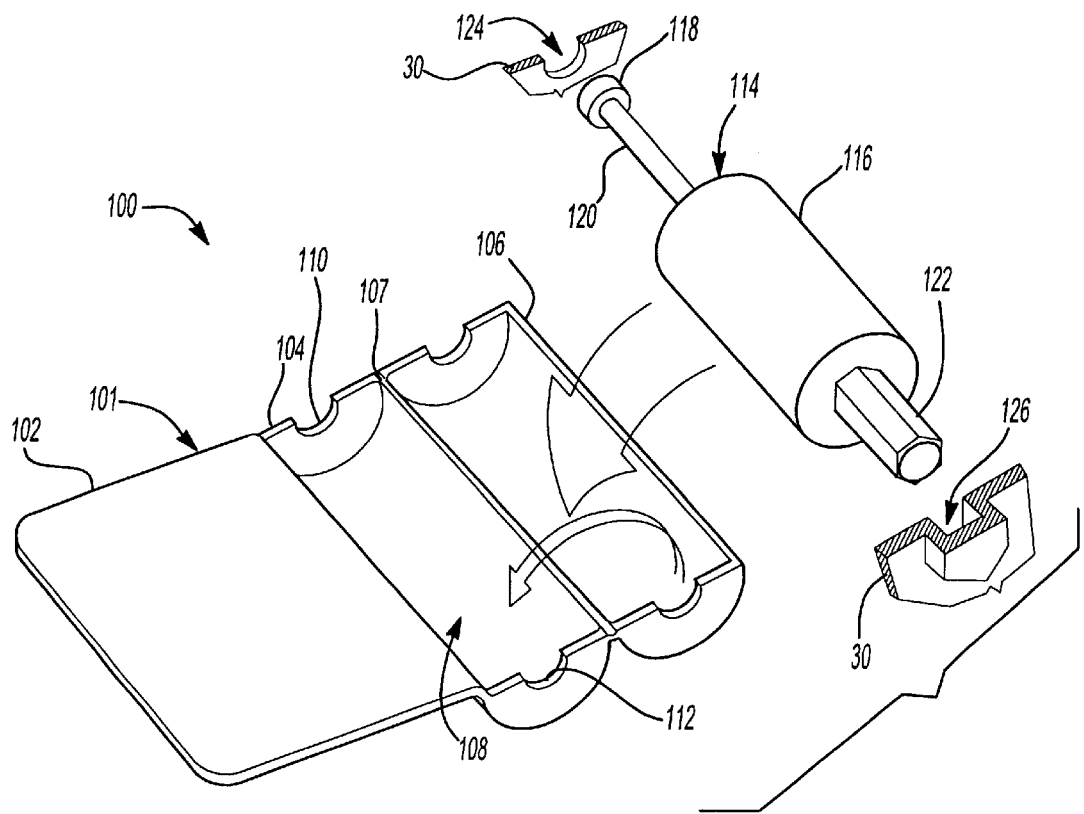
FIG. 4 is an exploded perspective view of a valve wherein a motor and gear assembly are housed in an integral compartment of the valve.

Referring now to FIG. 4 illustrates yet another embodiment valve assembly 100. Valve assembly 100 includes a valve 101 having a flap 102 for being pivoted into and out of abutting engagement with an air outlet in housing module 30 to open and close the outlet. Valve 101 includes a fixed drive housing 104 and a housing cover 106. Cover 106 is hinged to fixed drive housing 104 such that cover 106 can be rotated to form in combination with housing 104 an enclosed drive housing defining a recess therein that receives a drive unit 114. Drive unit 114 includes a motor and gear assembly 116 that has an electrical cable 120 extending from one end and a drive interface 122 extending from the other end. Drive interface 122 as illustrated is a shaft with a hexagonal cross section, but those skilled in the are will readily recognize that other non-circular cross sections can also be used for shaft 122 as described above. Drive unit 114 is retained within cavity 118 such that shaft 122 extends from aperture 112 on one end of valve 101 and pivot 118 is retained in aperture 110 at an opposite end such that pivot 118 also extends partially from valve 101. Valve assembly 100 extends between facing walls of module housing 30. Pivot 118 is pivotally retained in pivot recess 124 in a manner to permit valve assembly 100 to pivot with respect to module housing 30. At an opposite end of valve 101, shaft 122 extends through aperture 112 such that valve 101 pivots about shaft 122. Shaft 122 is fixedly engaged in interface recess 126 such that shaft 122 is not permitted to rotate with respect to module housing 30. Therefore, when the motor and gear assembly delivers a torquing force to shaft 122, shaft 122 is held stationary with respect to module housing 30 and valve assembly 100 pivots therearound. As illustrated, pivot 118 also functions as an electrical connector for routing electric power to drive unit 114.

Figure 5:
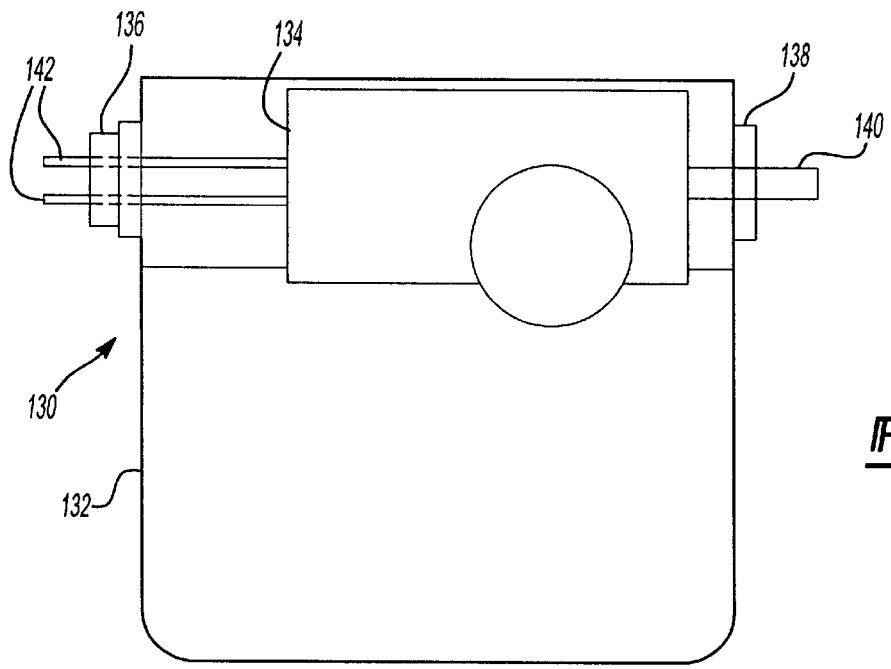
FIG. 5 is a plan view of a valve wherein a motor and gear assembly are affixed to a surface of the valve.

FIG. 5 illustrates a preferred embodiment 130 of a motorized valve assembly wherein assembly 130 comprises a valve 132 having pivots 136 and 138 at each end thereof and defining a pivot axis about which valve assembly 130 pivots. A drive unit 134 is affixed to valve 134 by adhesively bonding or by mechanical fasteners. Drive unit 134 is pre-assembled and self contained to minimize the amount of time required to assemble valve assembly 130. A drive interface 140 extends from one end of the valve 132 wherein drive interface 140 is a shaft having a non-circular cross section to facilitate being held stationary by the module housing in which valve assembly 132 is installed. Electrical wires 142 extend from pivot 136 to facilitate connecting valve assembly to an appropriate control and power source (not shown).

Figure 6:
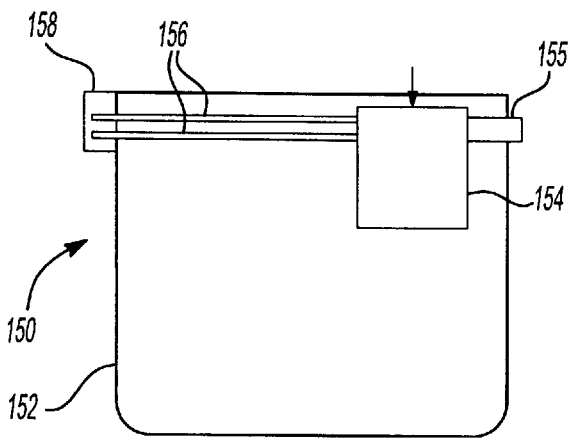
FIG. 6 is a valve assembly wherein electrical power is supplied to the valve through a socket at a hinge point.
Figure 7:
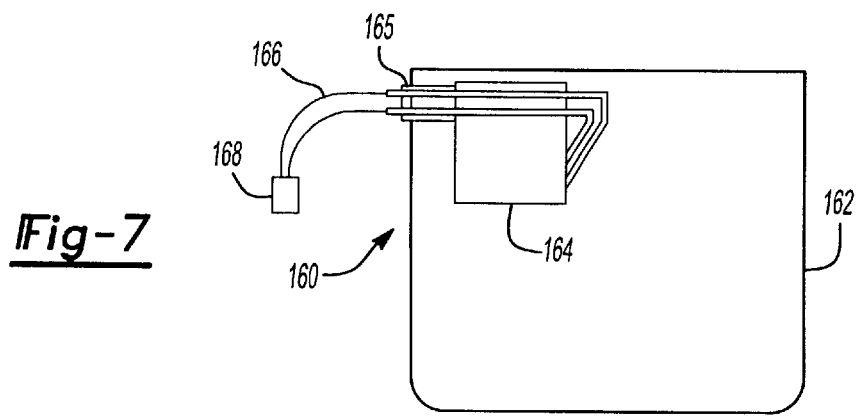
FIG. 7 is a valve assembly wherein electrical power is supplied to the valve through a wiring harness extending from a valve hinge point.

FIGS. 6 and 7 illustrate that the electrical wiring for powering and controlling the operation of the valve assembly can be routed through either of the pivot points and that the drive unit can be mounted to either sided of the valve. Valve assembly 150 illustrates drive unit 154 positioned on the right side of valve 152 wherein drive interface 155 extends to the right and electrical wires 156 extend to and terminate at pivot 158 which also functions a an electrical connector for interconnecting with an external wire harness (not shown). Alternatively, valve assembly 160 illustrates drive unit 164 positioned on the left side of valve 162 wherein the power and control wires 166 extend through drive interface 165 and can be "pig-tailed" exterior to the module housing or as illustrated can terminate in a connector 168 for connection to a power harness (not shown). Those practiced in the art will readily recognize that each of the features described with respect to the configurations of FIGS. 6 and 7 can be incorporated in any number of combinations.

Figure 8:
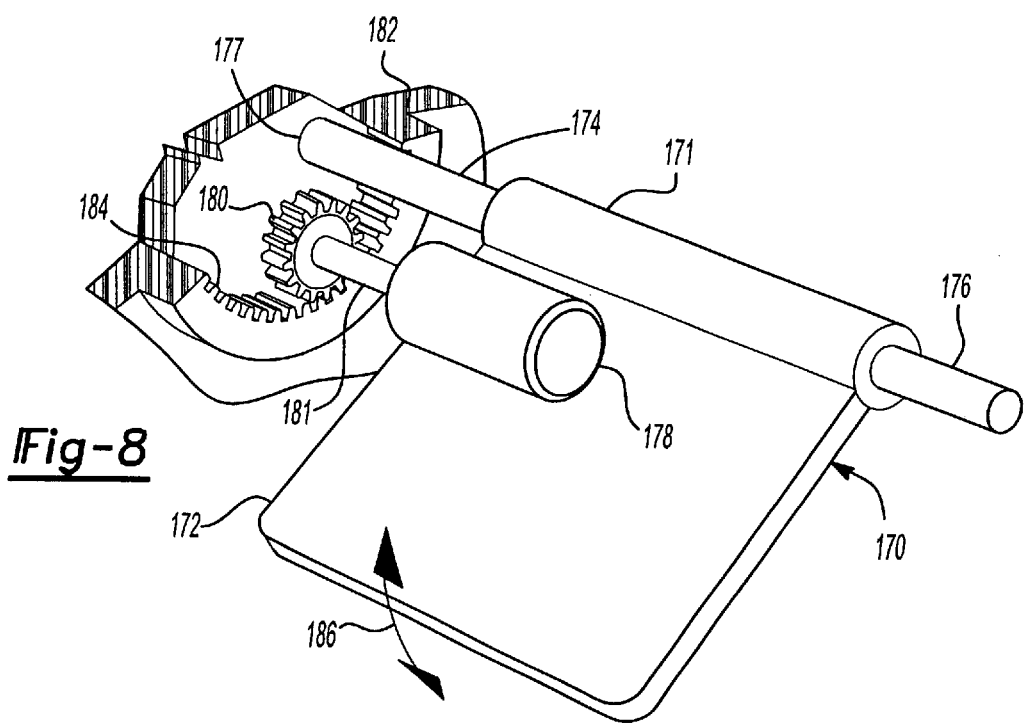
FIG. 8 is a perspective view of an alternate embodiment valve.

FIG. 8 discloses an alternative embodiment valve assembly 170. Valve assembly 170 includes a valve 171 having pivoting shafts 174 and 176 extending from opposite ends of valve 171. Shafts 174 and 176 have a circular cross section and each is received in a pivot recess 177 in module housing 182 such that shafts 174 and 176 are freely pivotable therein. One interior face of the module housing 182 defines an arcuate rack 184 of gear teeth such that said arcuate rack is substantially concentric with pivot shaft 174. A drive unit 178 includes an electric motor and a gear reduction assembly to provide a desired rotational output speed therefrom. Drive unit 178 has an output shaft 181 extending therefrom and a pinion gear 180 mounted on an outer end of the output shaft 181. The combined drive unit 178, drive shaft 181, and pinion gear 180 are positioned on and affixed to valve 171 in such a manner that the teeth of pinion gear 180 engage the teeth of arcuate rack 184. When drive unit 178 is powered, the pinion gear is caused to rotate, and as a result of its teeth interengaging with the teeth of arcuate rack 184, pinion gear 180 'walks' along rack 184. As pinion gear 180 walks along arcuate rack 184 valve 171 is caused to pivot about shafts 174 and 176 as shown by directional arrow 186.

Figure 9:
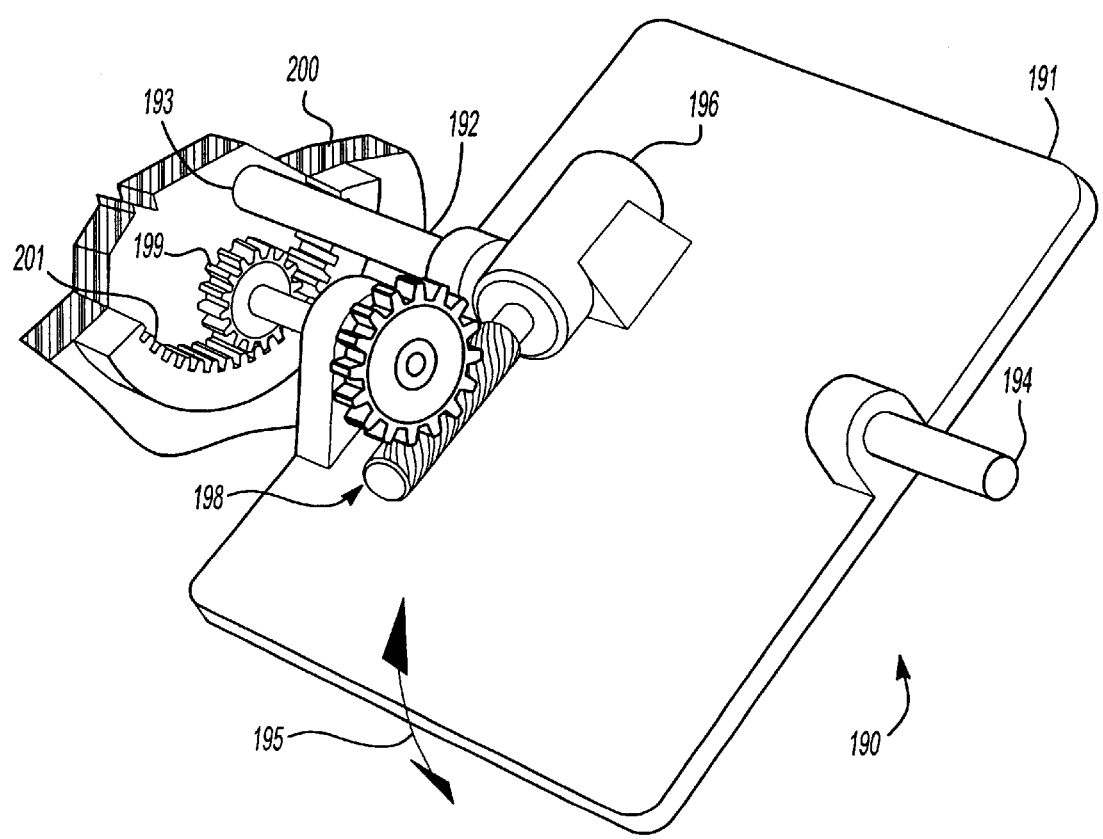
FIG. 9 is a perspective view of the valve of FIG. 8 wherein the dive motor is mounted proximate to the valve pivot axis.

FIG. 9 illustrates a variation of the embodiment shown in FIG. 8. Valve assembly 190 includes a butterfly valve 191 which has first and second pivoting shafts 192 and 194 extending outwardly from a center of valve 191. Each of shafts 192 and 194 are pivotally retained in a pivot recess defined by module housing 200. An electric motor 196 is positioned substantially on the pivoting axis of valve 191 as defined by shafts 192 and 194. Electric motor drives a gear reduction assembly 198, here shown as a worm gear driven by motor 196 and in turn driving a planetary gear which in turn drives pinion gear 199. Pinion gear 199 includes teeth therearound that engage intermeshing teeth of an arcuate rack 201 of gear teeth. When motor 196 is actuated to rotate in one direction or the other, pinion gear 199 is caused to 'walk' along arcuate rack 201 and thereby cause valve 191 to rotate according to directional arrow 195. The above configuration permits the centering of the mass of the combined electric motor 196 and gear reduction assembly 198 at the pivoting axis defined by shafts 192 and 194. The centering of this mass result is a very low moment of inertia to be overcome by motor 196. Thus, with the corresponding low moment of inertia, the power and size of motor 196 can be minimized to improve cost and efficiency of the valve assembly.

In the foregoing description those skilled in the art will readily appreciate that modifications may be made to the invention without departing from the concepts disclosed herein. Such modifications are to be considered as included in the following claims, unless these claims expressly state otherwise.

We claim:

1. A motorized valve assembly for use in a vehicle heating, ventilating, and air conditioning module, said motorized valve assembly comprising:

a valve having at least one flap and an integral motor housing having a cover hinged thereto for covering said motor, said flap being pivotable about a pivot axis;

an electric drive motor with a center affixed to said valve and disposed in said motor housing substantially coaxial with said pivot axis; and a drive interface operably connected to said drive unit for inducing a pivoting force about said pivot axis.

2. A motorized valve assembly according to claim 1 wherein said drive interface is a pinion gear for interengagement with a rack.

3. A motorized valve assembly according to claim 1 wherein said drive unit further comprises a reduction gear assembly interposed between said electric motor and said drive interface.

4. A motorized valve assembly according to claim 3 wherein said drive interface is a shaft having a non-circular cross-section.

5. A motorized valve assembly according to claim 3 wherein said drive interface is a pinion gear for interengagement with a rack.

6. An improved heating, ventilation, and air conditioning module for a vehicle, said module being of the type having a housing defining at least one air outlet therefrom, and first and second pivot recesses on opposite sides of said at least one air outlet, and at least one motorized valve assembly pivotally mounted for opening and closing said at least one air outlet, the improvement comprising:

said motorized valve assembly comprises a flap pivotable about a pivot axis, a first pivot positioned at a first end of said flap and received in said first pivot recess, and a second pivot positioned at a second end of said flap and received in said second pivot recess, said first pivot and said second pivot aligned along said pivot axis, an electric motor affixed to said flap for movement therewith about said pivot axis, and a drive interface operably reacting between said motor and said housing for inducing a pivoting force about said pivot axis to pivot said flap and said motor together between an open and a closed position.

7. The improved heating, ventilation, and air conditioning module according to claim 6 wherein at least one of said pivot recesses is enclosed to prevent air from flowing from an interior of said module to an exterior thereof.

8. The improved heating, ventilation, and air conditioning module according to claim 6 wherein said drive interface is a shaft having a non-circular cross section and said drive recess receives said shaft therein is a non-rotatable manner to prevent said shaft from rotating with respect to said module housing to effect said reaction between said motor and said housing.

9. The improved heating, ventilation, and air conditioning module according to claim 8 wherein said drive unit further includes a reduction gear assembly interposed between said electric motor and said shaft.

10. The improved heating, ventilation, and air conditioning module according to claim 6 wherein said drive interface is a pinion gear, and further wherein said housing defines an arcuate rack that receives said pinion gear thereon, such that rotation of said pinion gear by said electric motor causes said pinion gear to traverse along said arcuate rack and thereby pivot said valve assembly with respect to said module housing.

11. The improved heating, ventilation, and air conditioning module according to claim 10 wherein said drive further includes a gear reduction assembly operably interposed between said electric motor and said pinion gear.

12. The improved heating, ventilation, and air conditioning module according to claim 11 wherein said electric motor is positioned at said pivot axis.

13. The improved heating, ventilation, and air conditioning module according to claim 6 further including an electric connection to said electric motor and extending along said pivot axis to said housing to deliver electric power to said electric motor.

14. The improved heating ventilation, and air conditioning module according to claim 13 wherein said electric connection interfaces with an electrical connector at said one of said first and second pivots.

15. The improved heating, ventilation, and air conditioning module according to claim 13 wherein said one of said first and second pivots further comprises said electrical connection.

16. The improved heating, ventilation, and air conditioning module according to claim 6 wherein said flap further includes an integral motor housing, and further wherein said motor is received in said integral motor housing.

17. The improved heating, ventilation, and air conditioning module according to claim 16 wherein said integral motor housing includes a cover hinged thereto and further wherein said motor is enclosed within said covered integral motor housing.

* * * * *